US008752588B2

(12) United States Patent
Watanabe et al.

(10) Patent No.: US 8,752,588 B2
(45) Date of Patent: Jun. 17, 2014

(54) PRESSURE DAMPER, LIQUID JET HEAD, LIQUID JET RECORDING APPARATUS, AND METHOD FOR DAMPING PRESSURE

(75) Inventors: Toshiaki Watanabe, Chiba (JP); Yukihiro Saga, Chiba (JP)

(73) Assignee: SII Printek Inc. (JP)

( * ) Notice: Subject to any disclaimer, the term of this patent is extended or adjusted under 35 U.S.C. 154(b) by 277 days.

(21) Appl. No.: 13/138,529

(22) PCT Filed: Mar. 1, 2010

(86) PCT No.: PCT/JP2010/053276

§ 371 (c)(1), (2), (4) Date: Sep. 28, 2011

(87) PCT Pub. No.: WO2010/101124

PCT Pub. Date: Sep. 10, 2010

(65) Prior Publication Data

US 2012/0012206 A1 Jan. 19, 2012

(30) Foreign Application Priority Data

Mar. 5, 2009 (JP) ................................ 2009-052518

(51) Int. Cl.
*F16L 55/04* (2006.01)

(52) U.S. Cl.
USPC .............................................. 138/26; 138/30

(58) Field of Classification Search
USPC ............................................... 138/26, 30–31
See application file for complete search history.

(56) References Cited

U.S. PATENT DOCUMENTS

| | | | | |
|---|---|---|---|---|
| 4,287,917 | A * | 9/1981 | Frey | 138/30 |
| 4,427,029 | A * | 1/1984 | Charney et al. | 138/30 |
| 2005/0157041 | A1 | 7/2005 | Inoue | 347/40 |

FOREIGN PATENT DOCUMENTS

| | | |
|---|---|---|
| JP | 2006021383 | 1/2006 |
| JP | 2007136900 | 6/2007 |
| JP | 2007218759 | 8/2007 |
| JP | 2008265125 | 11/2008 |
| JP | 2009006696 | 1/2009 |
| JP | 2009202381 | 9/2009 |

* cited by examiner

*Primary Examiner* — Frederick C Nicolas
(74) *Attorney, Agent, or Firm* — Adams & Wilks

(57) ABSTRACT

A pressure damper has a main body with a recessed section for storing liquid. A thin film is mounted to the main body so as to hermetically seal the recessed section. A reference member is arranged in the recessed section of the main body and is configured to be brought into contact with or separated from the thin film. A detecting unit is configured to detect, without contacting the reference member, a displacement of the reference member due to a pressure change of the liquid stored in the recessed portion of the main body.

19 Claims, 9 Drawing Sheets

PRESSURE DAMPER, LIQUID JET HEAD, LIQUID JET RECORDING APPARATUS, AND METHOD FOR DAMPING PRESSURE

CROSS-REFERENCE TO RELATED APPLICATIONS

This application is a U.S. national stage application of International Application No. PCT/JP2010/053276 filed Mar. 1, 2010, claiming a priority date of Mar. 5, 2009, and published in a non-English language.

BACKGROUND OF THE INVENTION

1. Technical Field

The present invention relates to a pressure damper, a liquid jet head, a liquid jet recording apparatus, and a method of damping pressure.

2. Background Art

Conventionally, there has been known as an apparatus for jetting liquid toward a recording medium, a liquid jet recording apparatus in which liquid droplets are jetted from a plurality of nozzles toward a recording medium. Some of such liquid jet recording apparatus include a liquid jet head for jetting liquid as, for example, liquid droplets of about several to several tens of picoliters per droplet. In a liquid jet head for jetting such minute liquid droplets, liquid in the nozzles is controlled to be in a state which is optimal for being jetted in order to achieve satisfactory jetting of the liquid. Here, a state which is optimal for being jetted means that the pressure of liquid in the nozzles is negative and a meniscus is formed in the nozzles. An apparatus is known which, in order to make such pressure regulation, includes means for regulating the pressure of liquid in a part of a liquid flow path from a liquid accommodating body to a liquid jet head.

For example, Patent Document 1 describes an ink jet recording apparatus including a structure for regulating the pressure of liquid which is jetted from a liquid jet head (print head). The ink jet recording apparatus includes a sub-tank for storing a part of liquid accommodated in a liquid accommodating body (ink tank), and a pressure gage which is connected to a branch of a liquid supply path (ink supply path) from the sub-tank to the liquid jet head.

The ink jet recording apparatus may control the pressure of ink according to the usage status of the liquid jet head, and thus, discharge of ink may be stabilized and refilling may be improved.

CITATION LIST

Patent Document 1: JP 2005-231351 A

However, in the ink jet recording apparatus described in Patent Document 1, the pressure gage is connected to a conduit which is branched from apart of the liquid supply path, and thus, a part of the liquid which passes through the liquid supply path may enter the pressure gage side to be in contact with the pressure gage. Further, even if a partition or the like is provided so that the liquid is less liable to enter the conduit leading to the pressure gage, due to vibrations caused by the liquid jet head which moves at high speed, the liquid may scatter on the pressure gage side. In this case, there is a possibility that detection accuracy at the pressure gage is decreased by thickening or solidification of the liquid which adheres to the pressure gage. In this case, the pressure of liquid supplied to the liquid jet head is not appropriately controlled, and thus, there is a problem that the accuracy of the jetting liquid is decreased to affect the recording quality.

Further, with regard to ink jet printers in recent years, in printing a poster or a front surface of a signboard, a large-sized printer which may print a large print range is often used, and there is a tendency that the apparatus becomes larger in a specific field. In such a large-sized printer, compared with a case of a small-sized printer, the distance from the liquid accommodating body for accommodating liquid to be jetted to the liquid jet head is larger, and the length of the flow path for supplying liquid to the liquid jet head becomes larger. Therefore, in a large-sized apparatus, pressure loss on liquid in the flow path increases, and there is a possibility that liquid at a pressure which is appropriate for a liquid jetting environment is prevented from being supplied to the liquid jet head. Therefore, in order to accurately set a pressure value of liquid in the liquid jet head, it is necessary to measure the pressure value in the liquid jet head with high accuracy and to supply liquid at a proper pressure.

Further, when a carriage including a liquid jet head scans a print range, the flow path which communicates the liquid accommodating body and the liquid jet head is repeatedly displaced as the carriage moves, and thus, a pressure load is applied to liquid existing in the flow path. In this case, liquid affected by the pressure load is supplied to the liquid jet head located downstream of the flow path, and it is difficult to keep liquid at a pressure which is appropriate for the liquid jetting environment. Usually, such a pressure load applied to liquid is damped by a pressure damper, but still, the pressure loss due to the increased flow path affects liquid, and an appropriate printing environment is prevented from being achieved.

Further, as the print range becomes larger as described above, the scan range of the carriage including the liquid jet head also becomes larger, and thus, there is such a risk that liquid is supplied to the liquid jet head, which exceeds the damping ability of the pressure damping apparatus, and deterioration of the printing environment due to the larger size of the apparatus is expected.

As described above, in order to achieve a sophisticated printing environment for a printer, it is urgently necessary to accurately measure and grasp the pressure of liquid in the liquid jet head.

The present invention has been made in view of the above, and an object of the present invention is to provide a pressure damper, a liquid jet head, a liquid jet recording apparatus, and a method of damping pressure which may detect and control the pressure of liquid with high accuracy irrespectively of the type of liquid used.

SUMMARY OF THE INVENTION

In order to solve the above-mentioned problem, the present invention proposes the following measures.

The pressure damper of the present invention includes: a main body portion having a concave portion for storing liquid and a conduit open to the concave portion formed therein; a thin film which is disposed so as to hermetically seal the concave portion and which is fixed to the main body portion at a peripheral portion of the concave portion; a reference member which is freely brought into/out of contact with the thin film and which is disposed in the concave portion; and displacement amount detecting means for detecting change in relative position of the reference member with pressure fluctuations of the liquid stored in the concave portion without contacting the reference member.

According to the present invention, space for storing liquid is formed by the concave portion and the thin film, and the space is expanded/contracted according to pressure fluctuations of liquid. The reference member which is freely brought into/out of contact with the thin film and which is disposed in the concave portion relatively moves with respect to the concave portion in synchronization with the expansion/contraction, and the relative positional relationship undergoes displacement between before and after the pressure fluctuations. The displacement amount detecting means detects the pressure fluctuations of liquid without contacting the reference member. Therefore, a predetermined detection accuracy may be maintained irrespectively of the kind of the liquid.

Further, it is preferred that the pressure damper of the present invention further include a cover which is fixed to the main body portion for covering at least the concave portion.

In this case, the cover is included, and thus, noise from objects around the pressure damper is blocked out and variations of the detection accuracy when the pressure fluctuations of liquid are detected may be suppressed.

Further, it is preferred that in the pressure damper of the present invention, the displacement amount detecting means include a displacement amount sensor which is fixed so as to be opposed to the reference member on a surface of the cover on the concave portion side.

In this case, the displacement amount sensor is disposed on a surface of the cover on the concave portion side, and thus, both the displacement amount sensor and the reference member are located in the space hermetically sealed by the cover and the main body portion. Therefore, noise from the outside of the cover and of the main body portion may be appropriately suppressed. Further, members which protrude to the outside of the pressure damper may be reduced, and further, the displacement amount sensor is not exposed to the outside, and thus, unintentional breakage of the displacement amount sensor when the pressure damper is attached, used, and the like may be suppressed.

Further, it is preferred that the pressure damper of the present invention further include an urging member which is located in the concave portion between the reference member and the main body portion and which is elastically deformable in a thickness direction of the reference member.

In this case, the urging member defines the positional relationship between the concave portion and the reference member, and thus, tilt and misalignment of the reference member with respect to the concave portion are suppressed.

Further, the urging member causes the reference member and the concave portion to fluctuate with reference to the positional relationship therebetween when the urging member is in a natural state or when a specified pressure is applied thereto. Therefore, when the pressure of liquid fluctuates to a great extent, resilience of the urging member causes the positional relationship between the reference member and the concave portion to return to the positional relationship to be referred to. Therefore, a time lag from when the pressure fluctuations are caused to when force to suppress the pressure fluctuations develops may be reduced to regulate the pressure of liquid with high accuracy.

Further, it is preferred that the pressure damper of the present invention further include a sensor circuit portion electrically connected to the displacement amount sensor for detecting change in a signal generated by the displacement amount sensor and for sending a result of the detection to the outside.

In this case, the sensor circuit portion is provided for the pressure damper, and thus, a circuit length from the pressure damper to the sensor circuit portion may be reduced. Therefore, mixture of noise from the outside into change in a signal in the displacement amount sensor is suppressed, and a signal may be detected with higher accuracy.

Further, it is preferred that in the pressure damper of the present invention, the sensor circuit portion be disposed in space formed between the main body portion and the cover.

In this case, the sensor circuit portion is between the main body portion and the cover, and thus, means for detecting a displacement amount between the reference member and the displacement amount sensor are all disposed between the main body portion and the cover. Therefore, an outer shape of the pressure damper may be simplified to ease operation when the pressure damper is attached and the like.

Further, it is preferred that the pressure damper of the present invention, the reference member include a magnetic substance or a conductor, and the displacement amount sensor include a loop coil portion formed by winding a wire material in the shape of a loop in a plane in parallel with the reference member.

In this case, when the reference member relatively moves with respect to the loop coil portion, induced current is generated according to the displacement amount. Then, based on the induced current, displacement amount of the reference member with respect to the loop coil is quantitatively detected. Further, the pressure damper is structured to have a magnetic substance or a conductor and a loop coil, and thus, the manufacturing cost may be suppressed.

Further, it is preferred that the pressure damper of the present invention further include, between the cover and the displacement amount sensor, a magnetic substance layer or a conductor layer which contains a magnetic substance or a conductor.

In this case, the magnetic substance layer or the conductor layer which is provided between the cover and the displacement amount sensor acts as a shield, and that a magnetic field generated between the displacement amount sensor and the reference member passes through the cover and is diffused is suppressed. Therefore, change in the positional relationship between the displacement amount sensor and the reference member may be detected with high accuracy. Further, the magnetic substance layer or the conductor layer may decrease the influence of magnetic flux from the outside of the cover, and thus, mixture of noise into the displacement amount sensor may be suppressed.

Further, the cover may contain a magnetic substance or a conductor.

In this case, the cover functions as a electromagnetic shield, and thus, the influence of magnetic flux from the outside may be suitably suppressed, and mixture of noise into the displacement amount sensor is suppressed. Further, it is not necessary to prepare a member other than the cover as the shield, and thus, the structure may be simplified.

Further, it is preferred that the reference member has at least one hole formed therein.

In this case, when the hole is formed, the weight of the reference member becomes lighter accordingly, and thus, quickness of response to the pressure fluctuations of liquid is enhanced. Therefore, the reference member is promptly relatively moved with respect to the displacement amount sensor according to the pressure fluctuations of liquid. Therefore, a time lag from when the pressure fluctuations of liquid are caused to when the pressure fluctuations of the liquid are detected is shortened.

In another aspect, the liquid jet head of the present invention includes: the pressure damper of the present invention; and a jetting portion which has a plurality of nozzles for jetting the liquid and which is connected to any one of the conduit.

According to the present invention, because the pressure damper and the jetting portion are combined, the difference between the pressure of liquid at the jetting portion and the pressure on the pressure damper is small. Therefore, an error from the pressure on liquid which is actually jetted is reduced, and the pressure of liquid jetted from the nozzles may be regulated with high accuracy.

In another aspect, the liquid jet recording apparatus according to the present invention includes: the liquid jet head of the present invention; a liquid accommodating body for accommodating the liquid; a liquid supply tube connected between the liquid accommodating body and the pressure damper for passing the liquid therethrough; and a pump motor connected to a part of the conduit for pressing and moving or sucking and moving the liquid in the conduit based on a pressure value detected by the pressure damper.

According to the present invention, by pressing and moving liquid in the liquid supply tube, the pressure detected by the pressure damper may be regulated to a target pressure. Further, the pump motor may press and move liquid in an appropriate direction, i.e., to the pressure damper side or to the opposite side, and thus, the pressure on the pressure damper may be suitably increased or decreased.

Further, the liquid jet recording apparatus according to the present invention may further include: a moving mechanism for reciprocating the jetting portion under a state in which the jetting portion is opposed to a recording medium toward which the liquid is jetted; and a transfer mechanism for transferring the recording medium under a state in which a predetermined distance is kept between the recording medium and the jetting portion.

In another aspect, a method of damping pressure according to the present invention uses a damper including: a main body portion having a concave portion for storing liquid and a conduit open to the concave portion formed therein; a thin film which is disposed so as to hermetically seal the concave portion and which is fixed to the main body portion at a peripheral portion of the concave portion; a reference member which is freely brought into/out of contact with the thin film and which is disposed in the concave portion; and displacement amount detecting means for detecting change in relative position of the reference member with pressure fluctuations of the liquid stored in the concave portion without contacting the reference member.

According to the present invention, space for storing liquid is formed by the concave portion and the thin film, and the space is expanded/contracted according to pressure fluctuations of liquid. The reference member which is freely brought into/out of contact with the thin film and which is disposed in the concave portion relatively moves with respect to the concave portion in synchronization with the expansion/contraction, and the relative positional relationship undergoes displacement between before and after the pressure fluctuations. The displacement amount detecting means detects the pressure fluctuations of liquid without contacting the reference member. Therefore, a predetermined detection accuracy may be maintained irrespectively of the kind of the liquid.

Further, the method of damping pressure according to the present invention is the method of damping pressure as described above, in which the pressure damper further includes: displacement pressure calculating means included in the displacement amount detecting means for calculating a pressure value based on the displacement; and pressure control means for controlling the pressure value in a range of 0 kPa to −2 kPa.

According to the present invention, by including the pressure control means, which may control the pressure value of liquid in a desired range, a head value of a liquid jet head in liquid jet recording may be controlled.

According to the pressure damper, the liquid jet head, the liquid jet recording apparatus, and the method of damping pressure of the present invention, the pressure fluctuations of liquid supplied to the pressure damper may be quantitatively detected as a change in the position of the reference member without contacting the reference member. Therefore, the pressure may be detected and regulated with high accuracy irrespectively of the of liquid used.

DETAILED DESCRIPTION OF THE INVENTION

First Embodiment

A pressure damper, a liquid jet head, a liquid jet recording apparatus, and a method of damping pressure according to a first embodiment of the present invention are described below with reference to FIG. 1 to FIG. 10.

Figure 1:
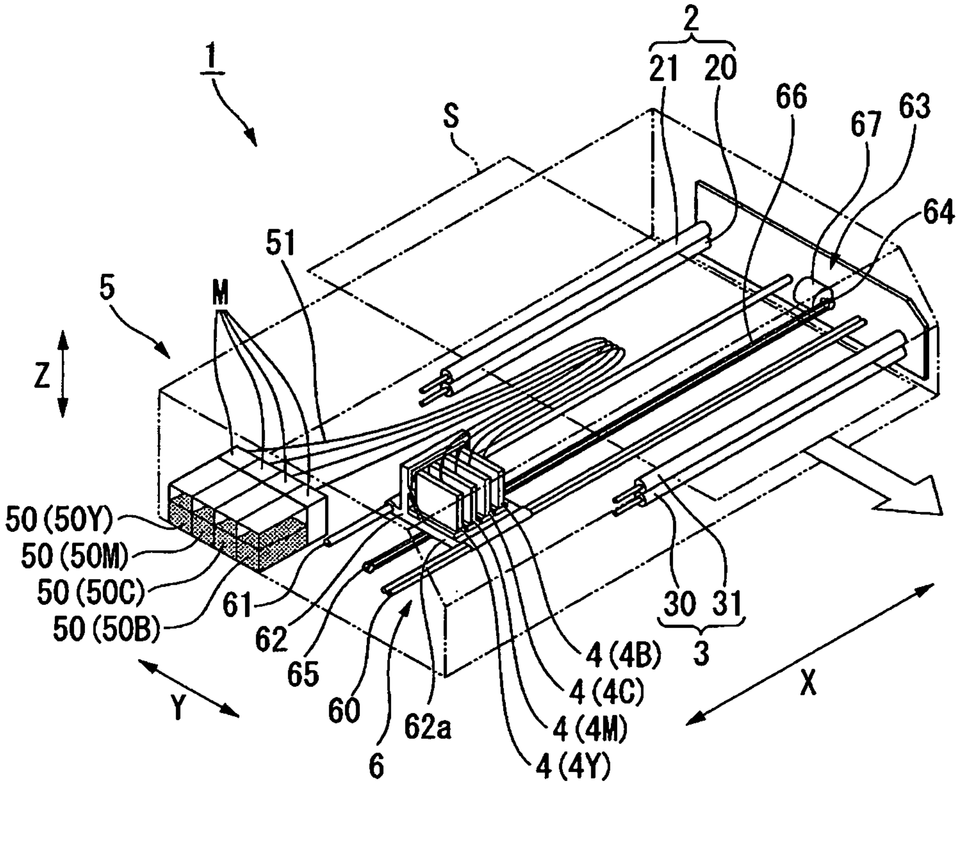
FIG. 1 is a perspective view illustrating a liquid jet recording apparatus according to a first embodiment of the present invention.

FIG. 1 is a perspective view illustrating a liquid jet recording apparatus 1. The liquid jet recording apparatus 1 includes a pair of transfer means 2 and 3 for transferring a recording medium S such as paper, liquid jet heads 4 for jetting liquid toward the recording medium S, liquid supply means 5 for supplying liquid to the liquid jet heads 4, and scanning means 6 for causing the liquid jet heads 4 to scan in a direction (auxiliary scan direction) which is substantially orthogonal to a transfer direction (main scan direction) of the recording medium S. The auxiliary scan direction, the main scan direction, and a direction orthogonal to both the X direction and the Y direction are hereinafter referred to as an X direction, a Y direction, and a Z direction, respectively.

The pair of transfer means 2 and 3 include grid rollers 20 and 30 which are provided so as to extend in the auxiliary scan direction, pinch rollers 21 and 31 which are provided so as to extend in parallel with the grid rollers 20 and 30, respectively, and drive mechanisms (not shown in detail), such as motors, for axially rotating the grid rollers 20 and 30, respectively.

The liquid supply means 5 includes liquid accommodating body 50 for accommodating liquid and liquid supply tubes 51 for connecting the liquid accommodating body 50 and the liquid jet heads 4. The plurality of liquid accommodating body 50 are, more specifically, liquid accommodating body 50Y, 50M, 50C, and 50B provided side by side for four kinds of liquid: yellow; magenta; cyan; and black. A pump motor M is provided for each of the liquid tanks 50Y, 50M, 50C, and 50B, and liquid may be pressed and moved via a liquid supply tube 51 to the liquid jet head 4. The liquid supply tube 51 is a flexible hose which is flexible to be able to accommodate movement of the liquid jet head 4 (carriage unit 62).

The scanning means 6 includes a pair of guide rails 60 and 61 which are provided so as to extend in the auxiliary scan direction, a carriage unit 62 which is slidable along the pair of guide rails 60 and 61, and a drive mechanism 63 for moving the carriage unit 62 in the auxiliary scan direction. The drive mechanism 63 includes a pair of pulleys 64 and 65 that are arranged between the pair of guide rails 60 and 61, an endless belt 66 which is looped over the pair of pulleys 64 and 65, and a drive motor 67 for rotationally driving one pulley 64 of the pulleys.

The pair of pulleys 64 and 65 are arranged between both end portions of the pair of guide rails 60 and 61, respectively, and are spaced in the auxiliary scan direction. The endless belt 66 is arranged between the pair of guide rails 60 and 61, and the carriage unit 62 is coupled to the endless belt. The plurality of liquid jet heads 4 are mounted on a proximal end portion 62*a* of the carriage unit 62. More specifically, liquid jet heads 4Y, 4M, 4C, and 4B are mounted side by side in the auxiliary scan direction for the four kinds of liquid: yellow; magenta; cyan; and black.

Figure 2A:
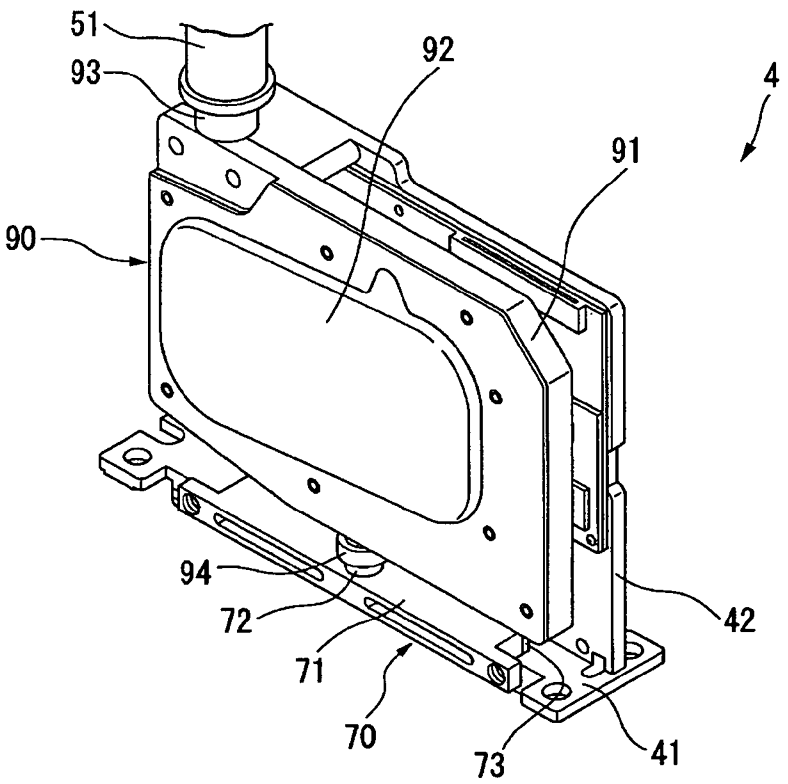
FIG. 2(*a*) is a perspective view illustrating a liquid jet head according to the first embodiment of the present invention, and FIG. 2(*b*) is a partially cutaway perspective view of the liquid jet head illustrated in FIG. 2(*a*).
Figure 2B:
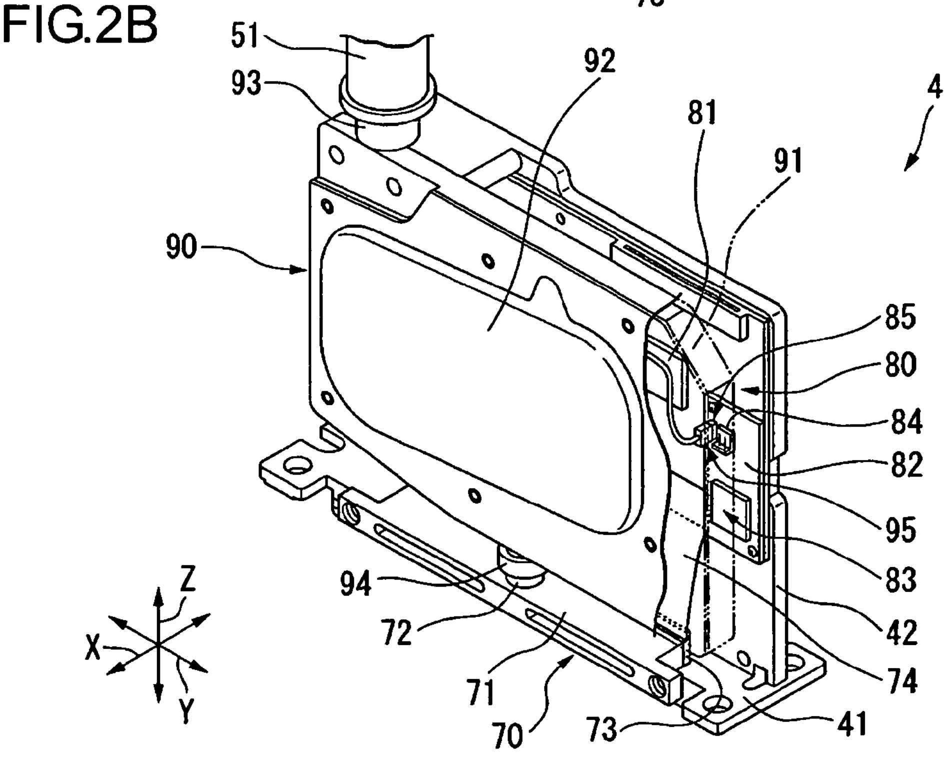

FIG. 2(*a*) is a perspective view illustrating the liquid jet head 4, and FIG. 2(*b*) is a partially cutaway perspective view of FIG. 2(*a*). As illustrated in FIG. 2(*a*) and FIG. 2(*b*), the liquid jet head 4 includes on bases 41 and 42 a jetting portion 70 for jetting liquid on the recording medium S (see FIG. 1), a control circuit board 80 which is electrically connected to the jetting portion 70, and a pressure damper 90 which is located between the jetting portion 70 and the liquid supply tube 51 for causing liquid to pass therethrough from the liquid supply tube 51 to the jetting portion 70 while damping pressure fluctuations of the liquid. It is to be noted that the bases 41 and 42 may be integrally formed.

The jetting portion 70 includes a flow path substrate 71 which is connected to the pressure damper 90 via a connecting portion 72, an actuator 73 having, for example, plates which are formed of ceramic and are disposed side by side in the main scan direction for causing liquid to be jetted as liquid droplets toward the recording medium S, and flexible wiring 74 which is electrically connected to the actuator 73 and the control circuit board 80 for sending a drive signal to piezoelectric elements of the actuator 73.

The control circuit board 80 includes control means 81 for generating a drive pulse for the actuator 73 based on a signal of pixel data or the like from a body control portion 100 (not shown) of the liquid jet recording apparatus 1 and a sub-substrate 82 provided on the control circuit board 80. Further, on the sub-substrate 82, a socket 85 which is connected to a connector 95 (to be described in detail later) extending from the pressure damper 90, a sensor circuit portion 83 which is electrically connected to the socket 85, and a socket 84 for connecting the sensor circuit portion 83 and the body control portion 100 are included.

The pressure damper 90 is formed by connecting a main body portion 91 and a cover 92, and the main body portion 91 is fixable to the base 42. Further, a connecting portion 93 which is detachably and watertightly attached to the liquid supply tube 51 and a connecting portion 94 which is detachably and watertightly attached to the connecting portion 72 of the jetting portion 70 are formed on the main body portion 91.

Figure 3:
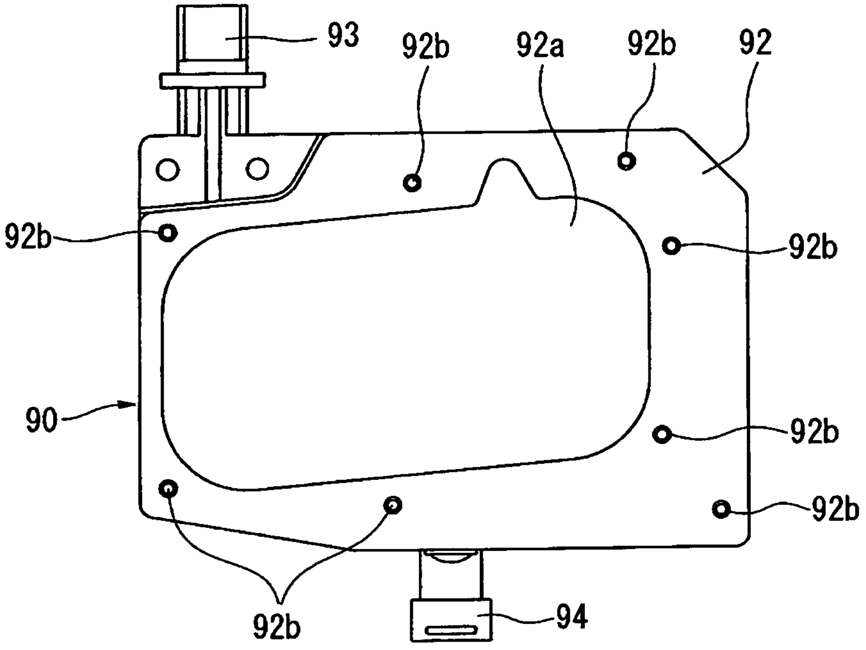
FIG. 3 is a front view illustrating a pressure damper according to the first embodiment of the present invention.

FIG. 3 is a front view illustrating the pressure damper 90. As illustrated in FIG. 3, the pressure damper 90 has screw fixing portions 92*b* at a plurality of places thereon surrounding a middle portion 92*a* of the cover 92 and is formed to be watertight.

Figure 4:
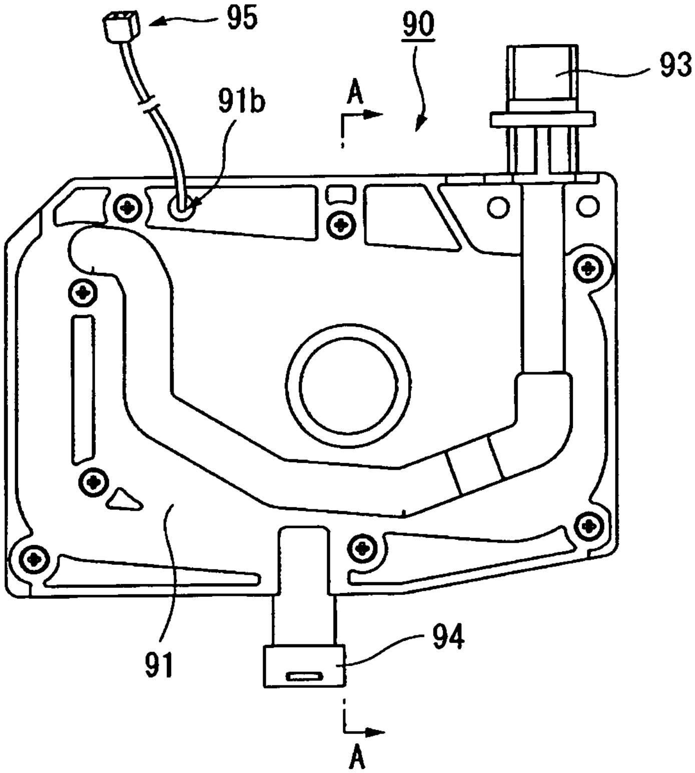
FIG. 4 is a rear view illustrating the pressure damper.

FIG. 4 is a rear view of the pressure damper 90. As illustrated in FIG. 4, a hole 91*b* is formed in the main body portion 91, and the connector 95 including lead wires therein extends from the hole 91*b*. The connector 95 has two terminals (not shown), which are respectively electrically connectable at the socket 85.

Figure 5:
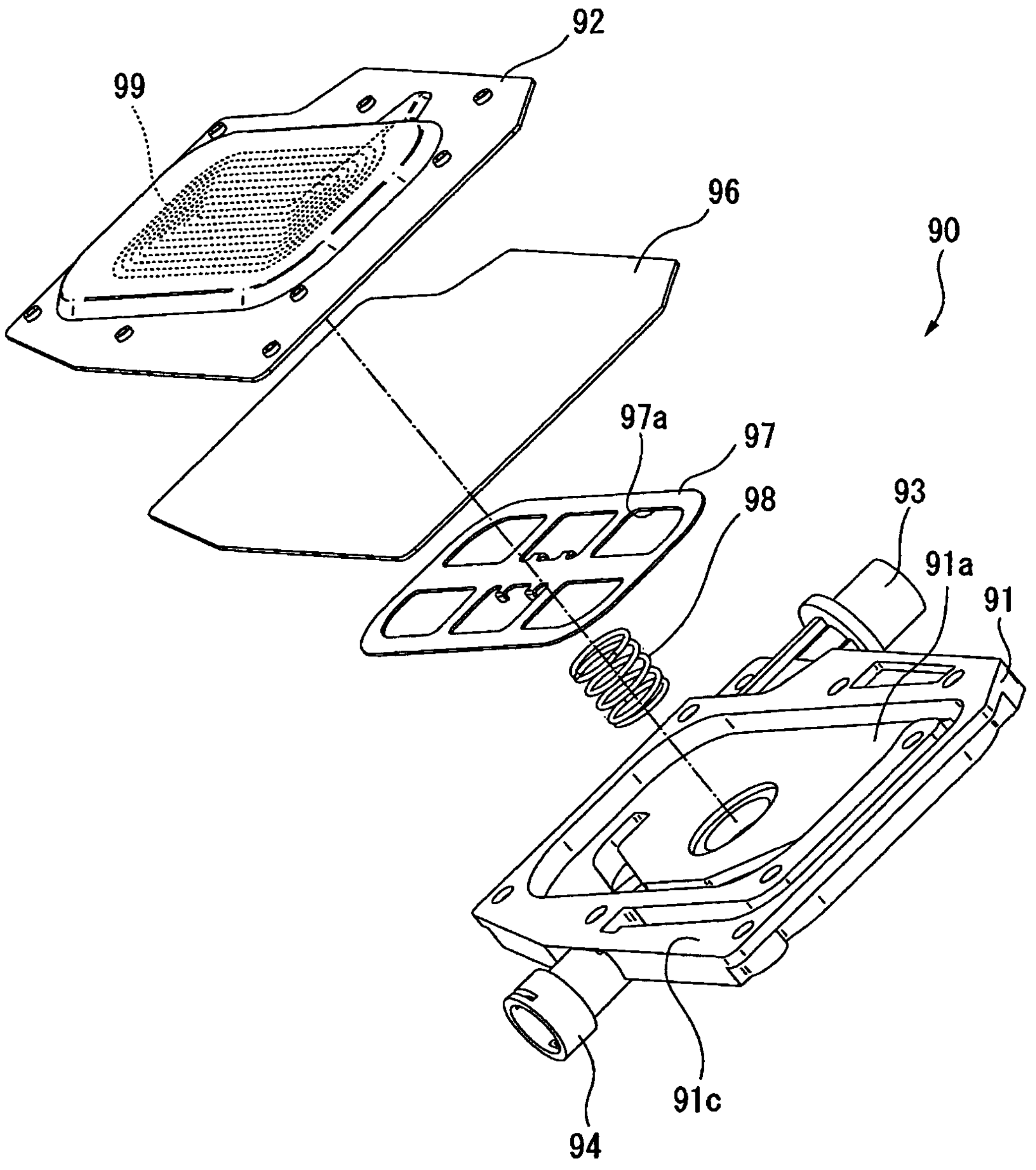
FIG. 5 is an exploded perspective view illustrating the pressure damper.

FIG. 5 is an exploded perspective view illustrating the pressure damper 90. As illustrated in FIG. 5, in the pressure damper 90, a thin film 96, a reference member 97, and an urging member 98 are provided in this order between the cover 92 and the main body portion 91 from the cover 92 to the main body portion 91. Further, a loop coil portion 99 which is a displacement amount sensor according to this embodiment is fixed to the cover 92.

The thin film 96 is a flexible film, and it is preferred that the thin film 96 be formed of a material which is, for example, corrosion-resistant to liquid supplied from the liquid accommodating body 50. Further, the thin film 96 is fixed to a peripheral portion 91*c* which is outside a concave portion 91*a* of the main body portion 91, and hermetically seals the concave portion 91*a*. It is to be noted that, although not illustrated in detail, both the connecting portion 93 and the connecting portion 94 are open to space formed by the concave portion 91*a* and the thin film 96.

As the reference member 97, for example, a plate material, which is formed of stainless steel or the like, and has holes 97*a* formed therein may be adopted. The reference member 97 is disposed in the concave portion 91*a* and is provided so as to be freely brought into/out of contact with the thin film 96. It is to be noted that, in this embodiment, holes 97*a* are formed in the reference member 97 to make lighter the weight of the reference member 97, but the reference member 97 may be formed of a plate material having no holes 97*a* formed therein or may be formed of a combination with round bar steel or square bar steel.

One end of the urging member 98 is in contact with the concave portion 91*a* while the other end of the urging member 98 is in contact with the reference member 97. Further, the urging member 98 in its natural state supports the reference member 97 at a predetermined position, which is described in detail later. As the urging member 98, a coil spring as illustrated in FIG. 5 may be adopted. Other than a coil spring, a leaf spring, a torsion spring, an air cushion mechanism, or the like may also be adopted.

Figure 6:
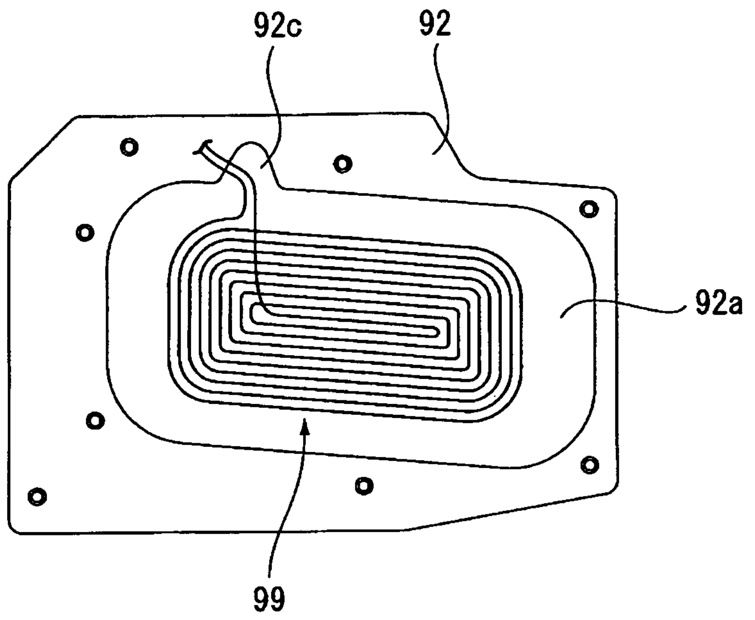
FIG. 6 is a rear view illustrating a structure of a part of the pressure damper.

FIG. 6 illustrates a back surface of the cover 92. In the figure, the cover 92 and the loop coil portion 99 are illustrated but the rest is omitted. As illustrated in FIG. 6, in this embodiment, the loop coil portion 99 is included as the displacement amount sensor. The loop coil portion 99 has a lead wire which is wound to be substantially in the outer shape of the reference member 97. End portions of the lead wire extend, after being routed to a lead portion 92*c*, to the outside through the hole 91*b* illustrated in FIG. 4, and are connected to the connector 95.

Figure 7:
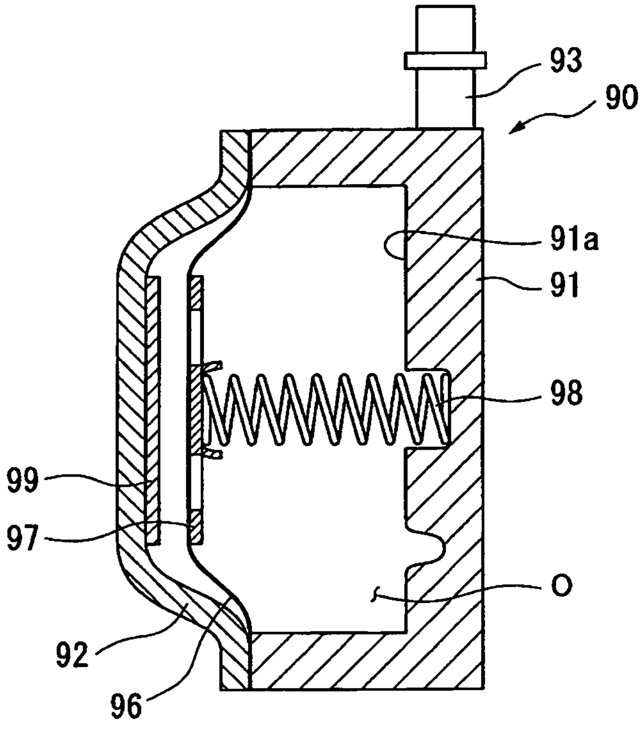
FIG. 7 is a sectional view taken along the line A-A of FIG. 4.

FIG. 7 is a sectional view taken along the line A-A of FIG. 4. As illustrated in FIG. 7, the cover 92 and the thin film 96 are fixed to the main body portion 91. The urging member 98 is adjusted so that, when the space between the thin film 96 and the concave portion 91*a* is at atmospheric pressure, the thin film 96 is offset to the cover 92 side via the reference member 97.

Here, a function of the cover 92 is described with reference to FIG. 5 and FIG. 7. As illustrated in FIG. 5 and FIG. 7, the cover 92 is formed so as to cover the thin film 96, and is formed on a side opposite to the concave portion 91*a* with respect to the thin film 96. The cover 92 plays a role when excessive pressure is applied to liquid which is filled into the space between the thin film 96 and the concave portion 91*a*. More specifically, when pressure is applied to liquid filled into the pressure damper 90, the thin film 96 is flexurally deformed on the cover 92 side. The thin film 96 is a flexible film, and thus, may be flexurally deformed in an allowable range of flexure, but, when excessive pressure beyond an allowable value is applied to liquid, there is a possibility that the thin film 96 is broken and the filled liquid leaks to the outside. By attaching the cover 92, the thin film 96 is flexurally deformed beyond a predetermined distance may be suppressed.

Figure 8:
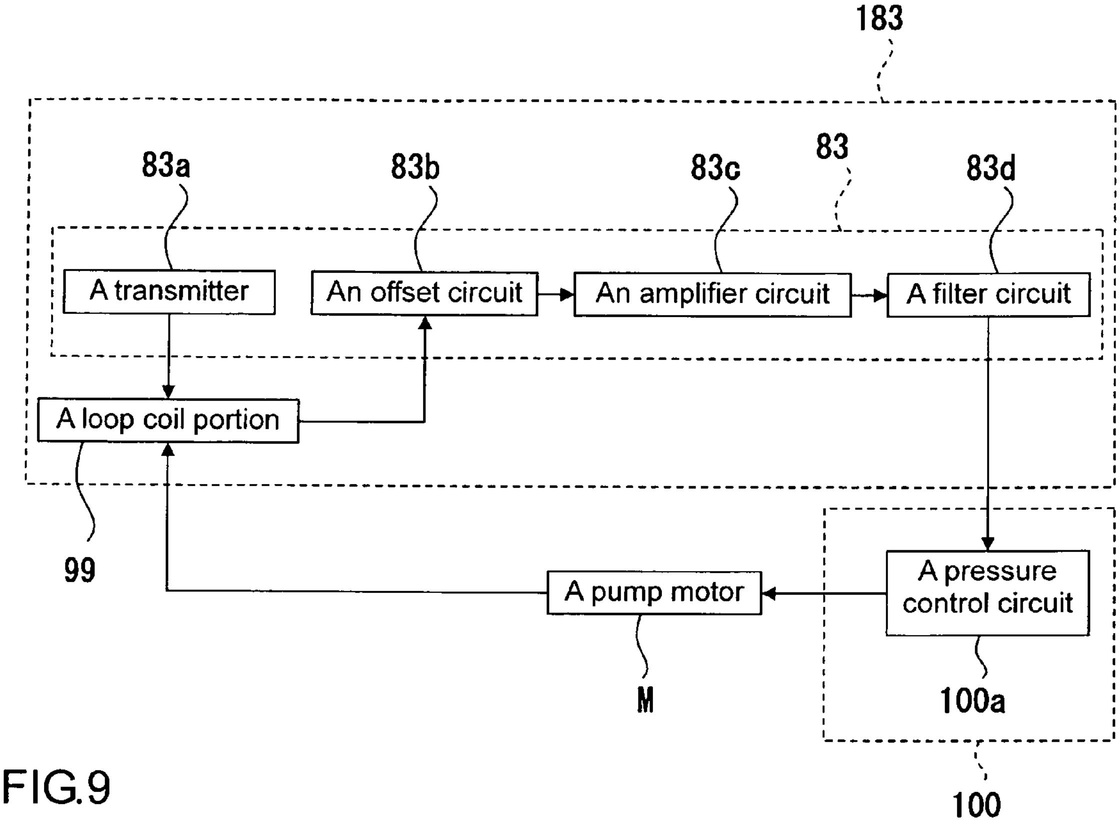
FIG. 8 is a block diagram illustrating an exemplary structure of displacement amount detecting means in the liquid jet recording apparatus according to the present invention.

FIG. 8 is a block diagram illustrating an exemplary structure of displacement amount detecting means (detecting unit) in the liquid jet recording apparatus 1 according to this embodiment. As illustrated in FIG. 8, displacement amount detecting means 183 is formed of a loop coil portion 99*a* as the displacement amount sensor and the sensor circuit portion 83 which sends/receives a signal to/from the loop coil portion 99.

A signal from which noise is removed by the filter circuit 83*d* is sent to the body control portion 100 via wiring (not shown) which is connected to the socket 84 illustrated in FIG. 2, or is referred to by the body control portion 100, and is used as a pressure value which is referred to by a pressure control circuit 100*a* or the like in order to, for example, regulate the pressure of liquid using the pump motor M.

Action of the pressure damper, the liquid jet head, and the liquid jet recording apparatus according to this embodiment which are structured as described above is described with reference to FIG. 9 to FIG. 14.

Figure 9:
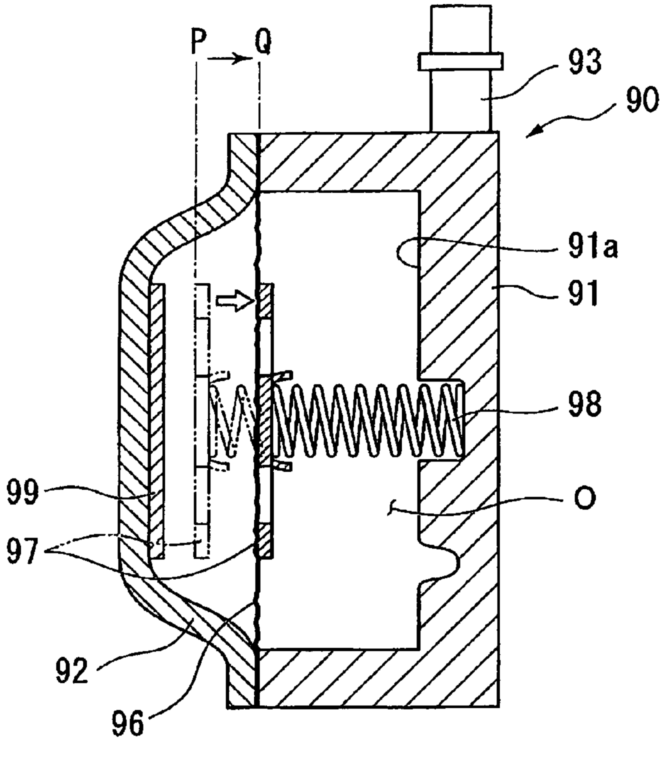
FIG. 9 is a sectional view illustrating the pressure damper when the liquid jet recording apparatus according to the first embodiment of the present invention is used.

FIG. 9 is a sectional view taken along the line A-A of FIG. 4 illustrating positional relationship when the pressure damper 90 is used.

As illustrated in FIG. 9, when the pressure damper 90 is used, the space between the thin film 96 and the concave portion 91*a* (hereinafter referred to as space O) is filled with liquid supplied from the liquid accommodating body 50. Here, pressure of liquid in the space O is lower than atmospheric pressure. Therefore, pressure toward the inside of the space O is applied to surfaces of the concave portion 91*a* and the thin film 96 which surround the space O. As a result, with the flexible thin film 96, the reference member 97 moves from an initial position P to a reference line Q. The reference line Q is a position of the reference member 97 at which the liquid jet recording apparatus 1 is on standby in a state of being able to jet liquid.

In this embodiment, the reference line Q is on a border between the main body portion 91 and the cover 92, at which the positional relationship is such that tension acting on the thin film 96 is at the minimum.

Figure 10:
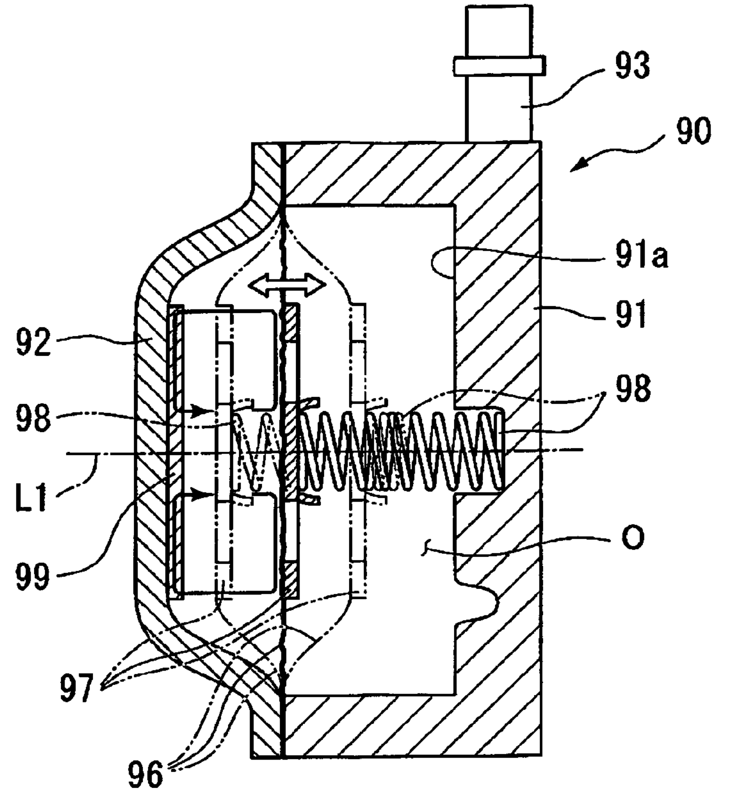
FIG. 10 is a sectional view illustrating a process step when the pressure damper is used.

FIG. 10 is a sectional view illustrating the operation of the pressure damper 90 when the liquid jet recording apparatus 1 is used. FIG. 10 is a sectional view taken along the line A-A of FIG. 4.

When the liquid jet recording apparatus 1 is used, by sliding the carriage unit 62 illustrated in FIG. 1 along the guide rails 60 and 61, the carriage unit 62 linearly reciprocates in the auxiliary scan direction. In accordance with the operation of the carriage unit 62, similarly, the liquid jet head 4 linearly reciprocates.

Here, by vibrations transmitted to the pressure damper 90 and the liquid supply tube 51, pressure fluctuations are caused in liquid stored in the space O in the pressure damper 90.

As illustrated in FIG. 10, due to the pressure fluctuations in the space O, the pressure of liquid is applied to the concave portion 91*a*, the thin film 96, and the reference member 97, respectively, and the flexible thin film 96 is deformed to expand/contract the space O. Here, at a portion of the thin film 96 on which the reference member 97 is disposed, the reference member 97 is operated so as to be translated in a direction illustrated by L1.

Here, the cover 92 is fixed to the main body portion 91 and the loop coil portion 99 is fixed to the cover 92, and thus, translation of the reference member 97 is operation of the reference member 97 to move closer to or away from the loop coil portion 99. Here, impedance of a reference signal generated from the above-mentioned transmitter 83*a* with respect to the loop coil portion 99 changes according to the change in the distance between the loop coil portion 99 and the reference member 97 and is transmitted to the sensor circuit portion 83.

Therefore, the pressure fluctuations of liquid are detected by the sensor circuit portion 83 as displacement of the reference member 97, and the pressure control circuit 100*a* in the body control portion 100 drives the pump motor M so that the difference from the impedance when the reference member 97 is at the reference line Q is eliminated. As a result, operation of the pump motor M regulates the pressure of liquid which passes through the liquid supply tube 51, which in turn regulates the pressure of liquid in the space O in the pressure damper 90.

As described above, according to the pressure damper 90 of this embodiment, the concave portion 91*a* and the thin film 96 form the space O for storing liquid, and the space O expands/contracts in accordance with the pressure fluctuations of liquid. The expansion/contraction of the space O is output as change in the distance between the reference member 97 and the loop coil portion 99. Therefore, the pressure fluctuations of liquid may be detected without contacting the liquid.

With conventional pressure detecting means, when the pressure detecting means is brought into contact with liquid, the pressure detecting means may be corroded or a malfunction of the pressure detecting means may occur, and, depending on the kind of the liquid, it may be that the pressure detecting means goes well with the liquid or does not go well with the liquid. On the other hand, according to the present invention, the pressure fluctuations of liquid may be detected without contacting the liquid, and thus, a certain level of detection accuracy may be maintained irrespectively of the kind of the liquid.

Further, the pressure damper 90 includes the cover 92 for covering the concave portion 91*a*, and thus, in addition to the above-mentioned function of the thin film 96 of suppressing flexural deformation, transmission of noise from objects around the pressure damper 90 is suppressed. In particular, even when a plurality of pressure dampers 90 are disposed side by side as in the liquid jet recording apparatus of this embodiment, magnetic interference due to operation of the respective reference members 97 decreases and variations in the detection accuracy when the pressure fluctuations of liquid are detected may be suppressed.

Further, the pressure damper 90 includes the urging member 98, and thus, the positional relationship between the concave portion 91*a* and the reference member 97 is determined by the urging member 98. Therefore, a tilt and a misalignment of the reference member 97 with respect to the concave portion 91*a* are suppressed.

Further, when the pressure of liquid greatly fluctuates, resilience of the urging member 98 returns the position of the reference member 97 to the reference line Q. Therefore, a time lag from when the pressure fluctuations are caused to when force to suppress the pressure fluctuations develops may be reduced to regulate the pressure of liquid with high accuracy.

Second Embodiment

Figure 11:
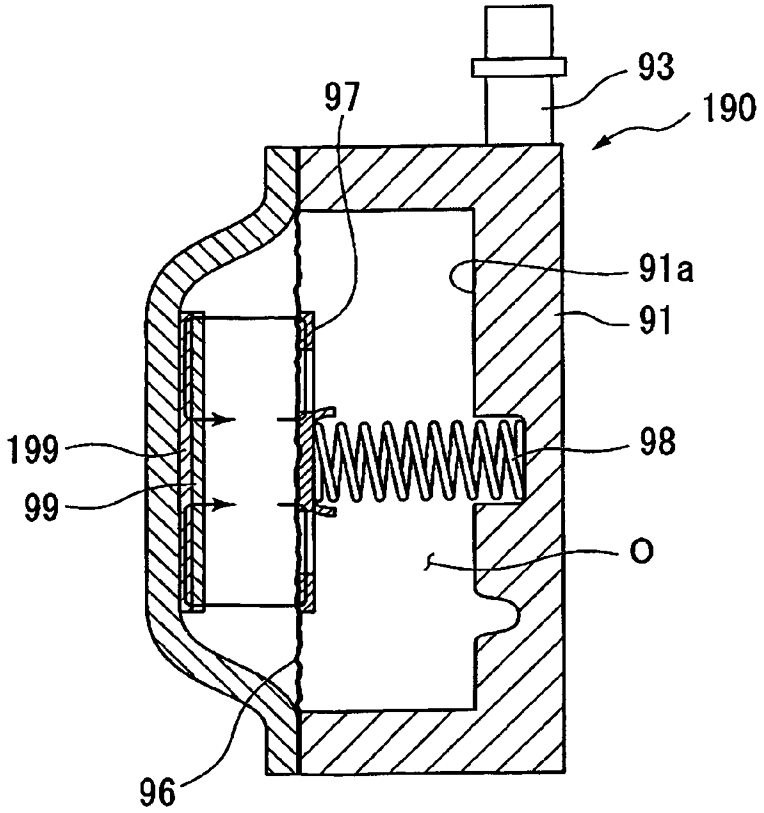
FIG. 11 is a sectional view illustrating a pressure damper according to a second embodiment of the present invention.

Next, a pressure damper according to a second embodiment of the present invention is described with reference to FIG. 11 and FIG. 12. It is to be noted that, in respective embodiments described in the following, like numerals and symbols are used to designate like or identical members in the pressure damper 90 of the above-mentioned first embodiment, and description thereof is omitted.

A pressure damper 190 according to this embodiment is different in structure from the pressure damper 90 according to the first embodiment in that a magnetic substance layer 199 is provided between the cover 92 and the loop coil portion 99.

The magnetic substance layer 199 is a layer the magnetic permeability of which is higher than that of the cover 92, and, for example, a sheet containing ferrite powder, a plate formed of ferrite, or a plate containing permalloy may be adopted.

In this embodiment, by providing the magnetic substance layer 199, the inductance of the loop coil portion 99 becomes higher, and thus, resolution in detecting change in the position of the reference member 97 may become higher.

It is to be noted that, in this embodiment, the magnetic substance layer 199 containing a magnetic substance is included, but a structure in which a conductor layer containing a conductor instead of the magnetic substance layer 199 is included may produce similar effects.

Modified Example 1

In the following, a modified example of the pressure damper 190 according to the second embodiment is described with reference to FIG. 12. FIG. 12 is a sectional view illustrating a pressure damper 290 as a modified example of the pressure damper 190 according to this embodiment.

Figure 12:
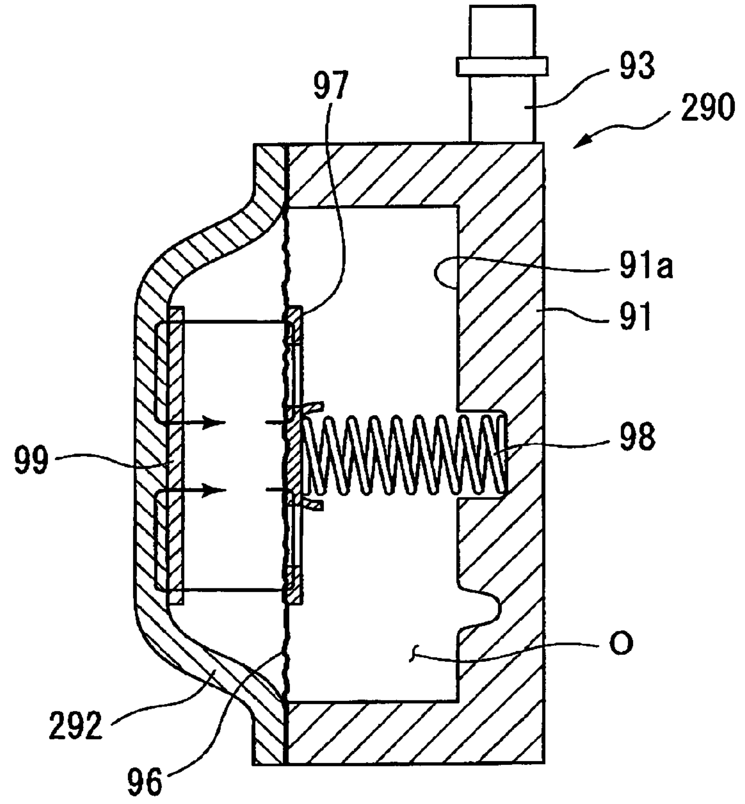
FIG. 12 is a sectional view illustrating a modified example of the pressure damper.

In this modified example, as illustrated in FIG. 12, a cover 292 is included instead of the cover 92. In the above-mentioned pressure damper 190, the cover 92 and the magnetic substance layer 199 are separate members. In the pressure damper 290, the cover also serves as the magnetic substance layer. More specifically, the cover 292 containing a material which is similar to that of the magnetic substance layer 199 and the magnetic permeability of which is higher than that of the cover 92 is fixed to the main body portion 91.

Similarly to the case of the pressure damper 190, this modified example may also enhance the resolution in detecting change in the position of the reference member 97.

It is to be noted that, in this Modified Example 1, the cover 292 that is formed to contain a material which is similar to that of the magnetic substance layer 199 and the magnetic permeability of which is high is described, but similar effects may be produced when the cover 292 is formed to contain a conductor.

Third Embodiment

Next, a pressure damper according to a third embodiment of the present invention is described with reference to FIG. 13.

Figure 13:
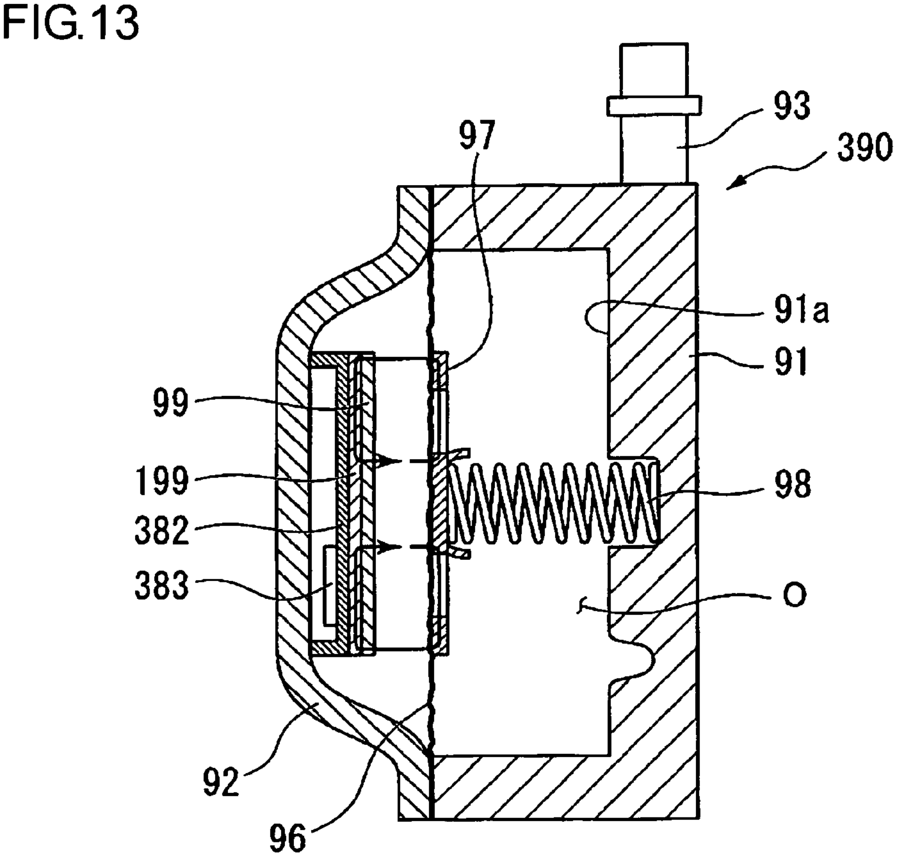
FIG. 13 is a sectional view illustrating a pressure damper according to a third embodiment of the present invention.

FIG. 13 is a sectional view illustrating a pressure damper 390 according to this embodiment. As illustrated in FIG. 13, the pressure damper 390 includes a sensor circuit portion 383 which is disposed in the space formed between the main body portion 91 and the cover 92 instead of the sensor circuit portion 83.

The sensor circuit portion 383 is attached to a substrate 382 which is located between the cover 92 and the loop coil portion 99, and is in a positional relationship in which its contact with liquid is controlled by the thin film 96.

In such a structure, the sensor circuit portion 83 is between the main body portion 91 and the cover 92, and thus, means for detecting a displacement amount between the reference member 97 and the loop coil portion 99 are all disposed between the main body portion 91 and the cover 92. Therefore, an outer shape of the pressure damper 390 may be simplified to simplify operation when the pressure damper is attached and the like.

Embodiments of the present invention are described in detail above with reference to the attached drawings, but the specific structure is not limited to the embodiments and design changes or the like which fall within the gist of the present invention are also included.

For example, the characteristic structures described in the above-mentioned embodiments may be appropriately combined with each other.

Further, in the first embodiment according to the present invention, a structure in which the sensor circuit portion 83 is disposed on the sub-substrate 82 on the control circuit board 80 is adopted, but the present invention is not limited thereto, and the members formed on the sub-substrate 82 may be attached to the pressure damper 90. In this case, the sensor circuit portion 83 is provided for the pressure damper 90, and thus, a circuit length from the pressure damper 90 to the sensor circuit portion 83 may be reduced. Therefore, mixture of noise from the outside into change in a signal in the loop coil portion 99 is suppressed, and a signal may be detected with higher accuracy.

Further, in the first embodiment according to the present invention, the loop coil portion 99 may be disposed in the space O. For example, even when the loop coil portion 99 is fixed to the concave portion 91*a* of the main body portion 91, change in the distance to the reference member 97 may be detected. It is to be noted that, only with regard to this case, the loop coil portion 99 is limited to a structure in which the loop coil portion 99 is formed of a conductor that is not corroded by the liquid or a structure in which the loop coil portion 99 has a protective layer against the liquid.

Figure 15:
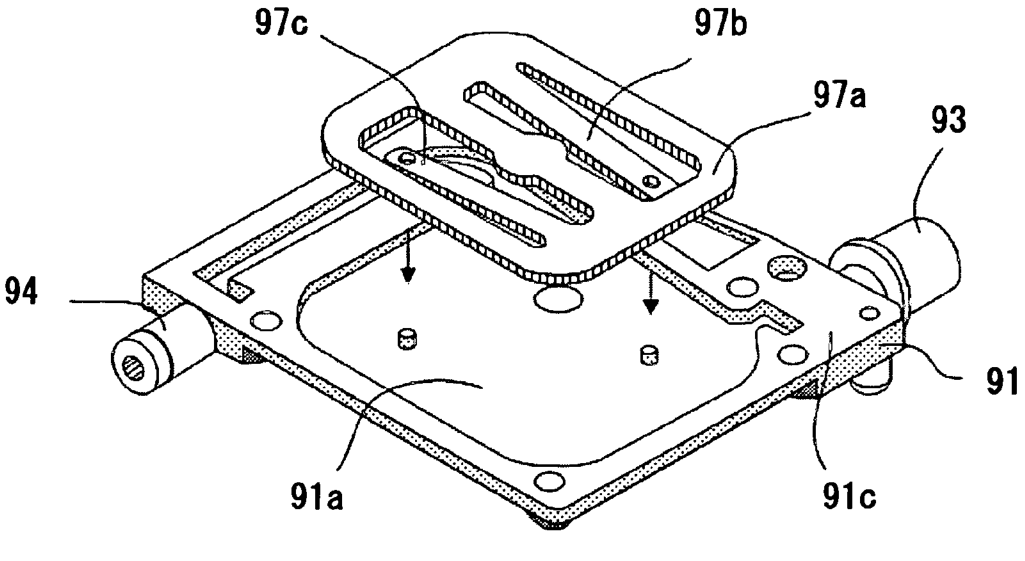
FIG. 15 is a sectional view illustrating still another exemplary structure of the pressure damper according to the present invention.

Further, in the first embodiment according to the present invention, for example, a plate member formed of stainless steel or the like is used as the reference member 97 and a coil spring is adopted as the urging member 98, which are separate members, but the reference member and the urging member may be a same member. For example, as illustrated in FIG. 15, it may be that a sloped portion 97*b* of a reference member 97*a* is sloped from the thin film 96 side to the concave portion 91*a* side illustrated in FIG. 5 and a tip portion 97*c* of the sloped portion 97*b* is provided so as to be freely brought into/out of contact with the concave portion 91*a*. More specifically, the tip portion 97*c* is not fixed to the concave portion 91*a*, and the sloped portion 97*b* serves as the above-described urging member by its elastic force. In this case, the sloped portion 97*b* is urged so that the tip portion 97*c* and the concave portion 91*a* are always in contact with each other and the reference member 97*a* and the thin film 96 are always in contact with each other.

It is to be noted that, although not illustrated in FIG. 15, a flexible substrate which is routed from the loop coil portion 99 and a spacer may be provided between the cover 92 and the thin film 96 which are illustrated in FIG. 5.

One end of the flexible substrate is connected to the loop coil portion 99 illustrated in FIG. 5 while the other end is, as a connector including a lead wire, connected to a control circuit board located in a head (not shown). In this way, a signal received from the loop coil portion 99 is sent via the control circuit board to a control portion of the liquid jet recording apparatus 1.

Further, although not illustrated in FIG. 15, as a modified example of the third embodiment in which the sensor circuit portion is located between the cover 92 and the loop coil portion 99 illustrated in FIG. 5, the structure illustrated as the loop coil portion 99 may be a structure in which the loop coil and the sensor circuit portion are integral with each other. Here, a spacer may be provided so as to prevent the sensor circuit portion from being brought into abutting contact with the cover 92.

Further, in the first embodiment according to the present invention, the block diagram illustrated in FIG. 8 is used to illustrate the displacement amount detecting means, but a structure for calculating the pressure value based on the displacement amount may be included. More specifically, a displacement/pressure calculating mechanism (not shown) may be included in the body control portion 100 illustrated in FIG. 8 for calculating the pressure value based on a signal received from the filter circuit 83*d*. In this case, the displacement/pressure calculating mechanism may supply the pressure value to the pressure control circuit 100*a*. It is to be noted that a threshold value may be provided with regard to the pressure value here and the pump motor M may be controlled so that the pressure value of liquid in the space O is in a range of 0 kPa to −2 kPa. It is to be noted that this is a very effective way to control a head value of the liquid accommodating body 50 in a discharging portion in the liquid jet head 4.

Further, in the third embodiment according to the present invention, a structure in which the sensor circuit portion 383 as a portion that is not in contact with liquid is disposed between the cover 92 and the thin film 96 is adopted, but if a protective layer for protection against liquid is provided for the sensor circuit portion 83, the sensor circuit portion 83 may be located at a portion at which the sensor circuit portion 83 is in contact with liquid, that is, in the space O.

Further, in the third embodiment according to the present invention, a structure in which the sensor circuit portion 383 is disposed in the space formed between the main body portion 91 and the cover 92 is described. More specifically, as illustrated in FIG. 13, a structure in which the substrate 382 is provided in the space formed between the main body portion 91 and the cover 92 and the sensor circuit portion 383 is disposed on the substrate 382 is described. Further, the magnetic substance layer 199 and the loop coil portion 99 are formed on a surface of the substrate 382 that is opposite to a surface on which the sensor circuit portion 383 is provided. The present invention is not limited thereto, and a structure may be adopted in which a substrate is disposed on a flat surface of the cover, a sensor circuit portion is provided on the substrate, and further, a magnetic substance layer or a conductor layer and the loop coil portion are provided on the substrate at a place that is opposed to the reference member, and all the sensor circuit portion, the magnetic substance layer or the conductor layer, and the loop coil portion are disposed on one surface side of the substrate. By adopting such a structure, space occupied by the pressure damper may be saved.

Figure 14:
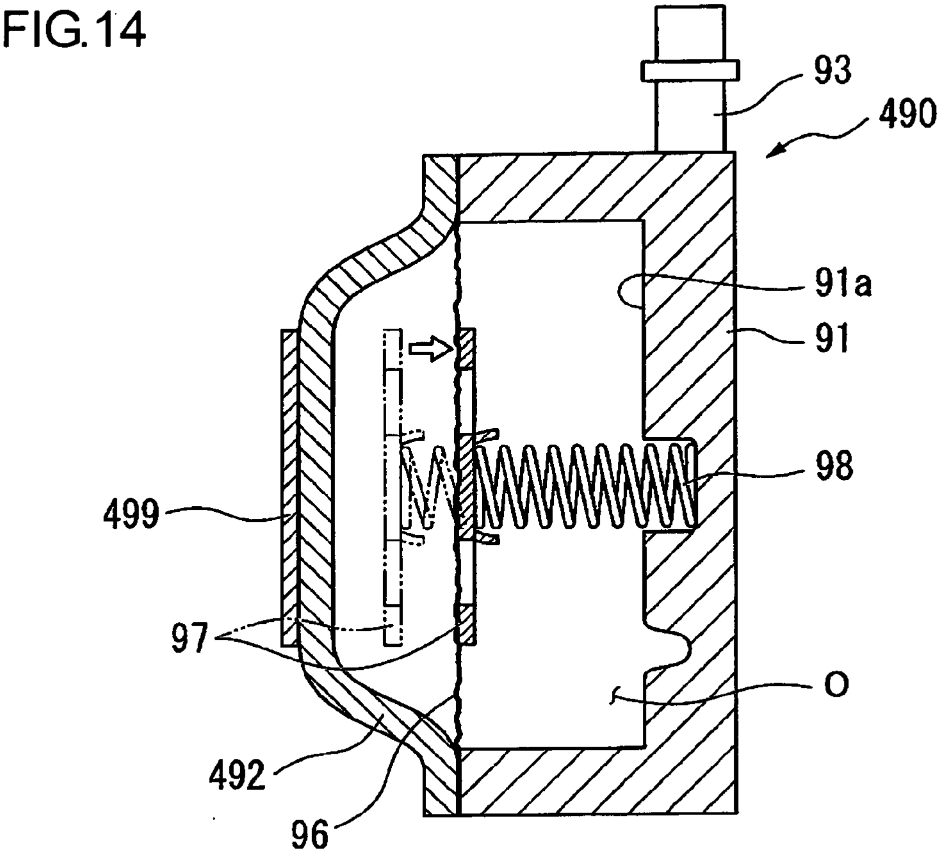
FIG. 14 is an explanatory view illustrating another exemplary structure of the pressure damper according to the present invention.

Further, for example, as illustrated in FIG. 14, a structure in which a loop coil portion 499 disposed on an outer surface side of a cover 492 is included instead of the loop coil portion 99 is also conceivable. In this case, the cover 492 may be formed of a resin material. More specifically, for example, in Modified Example 1 of the second embodiment according to the present invention, it is described that the cover 292 is a magnetic substance or a conductor, but, when the loop coil portion 499 is formed outside the cover 492 as illustrated in FIG. 14, if the cover 492 is formed of a resin material, displacement of the reference member 97 may be more easily detected. Of course, the cover 492 may be a magnetic substance or a conductor.

Further, in the embodiments according to the present invention, a system in which filling of liquid is carried out by pressure-filling using the pump motor M is described, but the present invention is not limited thereto. More specifically, a suction cap provided at a place which is opposed to a jetting surface for jetting liquid of the liquid jet head 4 and a suction pump that is provided in the liquid jet recording apparatus 1 and that is connected to the suction cap may be used. In such a structure, liquid is filled into the liquid jet head 4 by bringing the suction cap into abutting contact with the above-mentioned jetting surface and by suction with the suction pump.

REFERENCE SIGNS LIST

1 liquid jet recording apparatus
4 liquid jet head
51 liquid supply tube
83, 383 sensor circuit portion (displacement amount detecting means)
90, 190, 290, 390 pressure damper
91 main body portion
91*a* concave portion
92, 292, 492 cover
93 connecting portion (conduit)
94 connecting portion (conduit)
96 thin film
97 reference member
98 urging member
99, 499 loop coil portion (displacement amount sensor)
199 magnetic substance layer
M pump motor

The invention claimed is:

1. A pressure damper comprising:
  - a main body having a concave portion for storing liquid and having conduits opening to the concave portion;
  - a cover mounted to the main body for covering at least the concave portion;
  - a thin film fixedly mounted to the main body at a peripheral section of the concave portion and arranged so as to hermetically seal the concave portion;
  - a reference member disposed in the concave portion and configured to be brought into contact with or separated from the thin film; and
  - displacement amount detecting means for detecting, without contacting the reference member, a displacement of the reference member due to a pressure change of the liquid stored in the concave portion;

wherein the displacement amount detecting means comprises a displacement amount sensor fixedly mounted on a surface of the cover on the concave portion side so as to be opposed to the reference member.

2. A pressure damper according to claim 1; further comprising an urging member disposed in the concave portion between the reference member and the main body, the urging member being elastically deformable in a thickness direction of the reference member.

3. A pressure damper according to claim 1; wherein the reference member has at least one hole formed therein.

4. A pressure damper according to claim 1; further comprising an urging member disposed in the concave portion between the reference member and the main body, the urging member being elastically deformable in a thickness direction of the reference member.

5. A pressure damper according to claim 4; further comprising a sensor circuit portion electrically connected to the displacement amount sensor for detecting change in a signal generated by the displacement amount sensor and for outputting a result of the detection.

6. A pressure damper according to claim 5; wherein the sensor circuit portion is disposed in a space formed between the main body and the cover.

7. A pressure damper according to claim 1; wherein the reference member comprises a magnetic substance or a conductor; and wherein the displacement amount sensor comprises a loop coil portion formed by winding a wire material into a loop shape in a plane in parallel with the reference member.

8. A pressure damper according to claim 7; further comprising a magnetic substance layer containing a magnetic substance or a conductor layer containing a conductor, the magnetic substance layer or the conductor layer being disposed between the cover and the displacement amount sensor.

9. A pressure damper according to claim 8; wherein the cover contains a magnetic substance or a conductor.

10. A pressure damper according to claim 7; wherein the cover contains a magnetic substance or a conductor.

11. A liquid jet head comprising:

a pressure damper comprised of a main body having a concave portion for storing liquid and having conduits opening to the concave portion, a thin film fixedly mounted to the main body at a peripheral section of the concave portion and arranged so as to hermetically seal the concave portion, a reference member disposed in the concave portion and configured to be brought into contact with or separated from the thin film, and displacement amount detecting means for detecting, without contacting the reference member, a displacement of the reference member due to a pressure change of the liquid stored in the concave portion; and a jetting portion having a plurality of nozzles for jetting the liquid, the jetting portion being connected to any one of the conduits of the main body.

12. A liquid jet recording apparatus comprising:

a liquid jet head according to claim 11;

a liquid accommodating body for accommodating the liquid;

a liquid supply tube connected between the liquid accommodating body and the pressure damper for passing the liquid therethrough; and a pump motor connected to the one conduit for pressing and moving or sucking and moving the liquid in the one conduit based on a pressure value detected by the pressure damper.

13. A liquid jet recording apparatus according to claim 12; further comprising:

a moving mechanism for reciprocating the jetting portion under a state in which the jetting portion is opposed to a recording medium toward which the liquid is jetted; and a transfer mechanism for transferring the recording medium under a state in which a predetermined distance is maintained between the recording medium and the jetting portion.

14. A method of damping pressure, comprising:

providing a pressure damper comprising: a main body having a concave portion for storing liquid; a cover mounted to the main body for covering at least the concave portion; a thin film fixedly mounted to the main body at a peripheral section of the concave portion and arranged so as to hermetically seal the concave portion; a reference member disposed in the concave portion and configured to be brought into contact with or separated from the thin film; and a displacement amount sensor fixedly mounted on a surface of the cover on the concave portion side so as to be opposed to the reference member;

detecting, using the displacement amount sensor and without contacting the reference member, a displacement of the reference member due to a pressure change of the liquid stored in the concave portion;

calculating a pressure value of the liquid on the basis of the detected displacement; and controlling the pressure value of the liquid to a preselected pressure range.

15. A method according to claim 14;

wherein the preselected pressure range is 0 kPa to −2 kPa.

16. A pressure damper comprising:

a main body having a recessed section for storing liquid;

a cover mounted to the main body for covering at least the recessed section;

a thin film mounted to the main body so as to hermetically seal the recessed section;

a reference member arranged in the recessed section of the main body and configured to be brought into contact with or separated from the thin film; and a detecting unit configured to detect, without contacting the reference member, a displacement of the reference member due to a pressure change of the liquid stored in the recessed portion of the main body;

wherein the detecting unit comprises a displacement amount sensor fixedly mounted on a surface of the cover on the recessed section side so as to be opposed to the reference member.

17. A pressure damper according to claim 16; wherein the detecting unit is further configured to calculate a pressure value of the liquid on the basis of the detected displacement and to control the pressure value of the liquid in a range of 0 kPa to −2 kPa.

18. A method of damping pressure in a liquid jet head, the method comprising:

providing a liquid jet head comprising: a pressure damper having a main body having a concave portion for storing liquid, a thin film fixedly mounted to the main body at a peripheral section of the concave portion and arranged so as to hermetically seal the concave portion, and a reference member disposed in the concave portion and configured to be brought into contact with or separated from the thin film; and a jetting portion having a plurality of nozzles for jetting the liquid, the jetting portion being connected to any one of the conduits of the main body;

detecting, without contacting the reference member, a displacement of the reference member due to a pressure change of the liquid stored in the concave portion;

calculating a pressure value of the liquid on the basis of the detected displacement; and controlling the pressure value of the liquid to a preselected pressure range.

19. A liquid jet head comprising:

a pressure damper having a main body with a recessed section for storing liquid, a thin film mounted to the main body so as to hermetically seal the recessed section, a reference member arranged in the recessed section of the main body and configured to be brought into contact with or separated from the thin film, and a detecting unit configured to detect, without contacting the reference member, a displacement of the reference member due to a pressure change of the liquid stored in the recessed portion of the main body; and a jetting portion having a plurality of nozzles for jetting the liquid, the jetting portion being connected to any one of the conduits of the main body.

* * * * *